United States Patent
Masumoto

(10) Patent No.: US 10,129,500 B2
(45) Date of Patent: Nov. 13, 2018

(54) MULTI-DISPLAY APPARATUS

(71) Applicant: Panasonic Intellectual Property Management Co., Ltd., Osaka (JP)

(72) Inventor: Junji Masumoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/290,338

(22) Filed: Oct. 11, 2016

(65) Prior Publication Data
US 2017/0134690 A1    May 11, 2017

(30) Foreign Application Priority Data

| Nov. 6, 2015 | (JP) | 2015-218167 |
| Nov. 24, 2015 | (JP) | 2015-228326 |
| Dec. 1, 2015 | (JP) | 2015-234368 |
| Sep. 30, 2016 | (JP) | 2016-192814 |

(51) Int. Cl.
*G06F 3/14* (2006.01)
*G09G 5/00* (2006.01)
*H04N 7/01* (2006.01)

(52) U.S. Cl.
CPC ......... *H04N 7/0127* (2013.01); *G06F 3/1438* (2013.01); *G06F 3/1446* (2013.01); *G09G 5/006* (2013.01); *G09G 2300/026* (2013.01); *G09G 2370/02* (2013.01); *G09G 2370/042* (2013.01)

(58) Field of Classification Search
CPC .............. G06F 3/1438; G06F 3/1446; G09G 2300/026; G09G 2370/02; G09G 2370/042; G09G 5/006; H04N 7/0127
See application file for complete search history.

(56) References Cited

U.S. PATENT DOCUMENTS

| 6,549,948 | B1 | 4/2003 | Sasaki et al. |
| 2002/0030635 | A1* | 3/2002 | McGowan ............... G09G 5/12 345/5 |
| 2008/0008191 | A1 | 1/2008 | Eguchi |

(Continued)

FOREIGN PATENT DOCUMENTS

| JP | 8-163556 | 6/1996 |
| JP | 11-327522 | 11/1999 |

(Continued)

*Primary Examiner* — Afroza Chowdhury
(74) *Attorney, Agent, or Firm* — McDermott Will & Emery LLP

(57) ABSTRACT

The multi-display apparatus of the present disclosure is a multi-display apparatus for displaying a single image by combining a plurality of displays. The multi-display apparatus includes the plurality of displays connected to a network. Each of the plurality of displays includes a communication unit that communicates via the network and a controller. The controller determines whether a video signal can be reproduced at a predetermined display frame rate. When the video signal cannot be reproduced at the predetermined display frame rate, the controller changes a display frame rate from the predetermined display frame rate, and notifies other display of the display frame rate changed. When the display frame rate changed is notified from the other display, the controller changes the display frame rate to the display frame rate notified to reproduce the video signal.

9 Claims, 14 Drawing Sheets

(56) References Cited

U.S. PATENT DOCUMENTS

| | | | |
|---|---|---|---|
| 2008/0079658 A1* | 4/2008 | Naito | G06F 3/1446 345/2.2 |
| 2013/0258054 A1 | 10/2013 | Park et al. | |
| 2016/0132282 A1* | 5/2016 | Choi | G09G 5/006 345/1.3 |

FOREIGN PATENT DOCUMENTS

| | | |
|---|---|---|
| JP | 2005-223821 | 8/2005 |
| JP | 2008-015880 | 1/2008 |
| JP | 2008-164986 | 7/2008 |
| JP | 2009-122412 | 6/2009 |
| JP | 2009-198952 | 9/2009 |
| JP | 2013-106132 | 5/2013 |
| JP | 2013-205821 | 10/2013 |
| JP | 2014-504083 | 2/2014 |

* cited by examiner

MULTI-DISPLAY APPARATUS

BACKGROUND

1. Technical Field

The present disclosure relates to multi-display apparatuses.

2. Description of the Related Art

PTL1 discloses a multi-display system that displays one entire image by displaying multiple divided images on multiple displays. In this multi-display system, an image marker indicating an applicable frame number is inserted to one frame of video signal sent from a video signal unit to each display. Each display receiving the video signal to which this image marker is inserted displays the image by mutually synchronizing displays to match the frame number contained in the image marker. This enables to display one entire image by multiple displays without a sense of incongruity.

PTL2 discloses a multi-stream reproduction system that displays an image by synchronizing multiple streams sent via a network at the receiver side. In this multi-stream reproduction system, a multi-stream synchronizer receiving multiple streams to which time data is added compares time data added to each stream, stores in a buffer the streams other than the most delayed stream based on a comparison result, and reads out and outputs these stored streams at a timing that can be synchronized with the most delayed stream. This enables synchronous reproduction of multiple streams.

PTL3 discloses a multi-display apparatus that employs broadcast, which is a standard protocol of Ethernet (registered trademark). In this multi-display apparatus, an image transmission server is connected in a bus type to multiple displays by Ether cable, so as to send image streams from the image transmission server to each display. This can configure a large pseudo-single display.

PTL4 discloses a multi-display apparatus similar to PTL3. This multi-display apparatus includes a DHCP server for assigning an IP address specific to each display, an imaging device for capturing a display image of each display, and a apparatus for sending display data to a display having a specific address. This can associate a physical display position of each display with IP address.

CITATION LIST

Patent Literature

PTL1 Unexamined Japanese Patent Publication No. 2013-205821

PTL2 Unexamined Japanese Patent Publication No. 2005-223821

PTL3 Unexamined Japanese Patent Publication No. 2013-106132

PTL4 Unexamined Japanese Patent Publication No. 2008-164986

SUMMARY

In PTL1, a frame that has a desired frame number cannot be displayed at a desired timing if a video signal reproduction capability of a receiver display is insufficient. As a result, display timings of video signals among displays do not match.

In PTL2, a reproduction processing time may exceed a predetermined time due to an insufficient stream reproduction capability. This may result in coexistence of a receiver that cannot display a desired stream image at time data added to the stream. Synchronous reproduction will then be conducted based on a display timing of this receiver with most delayed display. Accordingly, an image cannot be displayed at a timing required by stream, and also a schedule is delayed if stream images are displayed according to a schedule, causing operation failure.

In PTL3, an IP address is automatically assigned to each display from an image transmission server equipped with a function of DHCP server. However, in a large single display pseudo-configured with displays, physical positions of the displays are not clear. Therefore, a physical position and an IP address of each display must be manually associated. For example, in case of a 5×5 multi-display, a cumbersome work of setting 25 units occurs.

On the other hand, in PTL4, a separate man-hour is needed for preparing an imaging device and installing it to a position capable of capturing an image of the entire multi-display apparatus.

The present disclosure offers a multi-display apparatus that can match an image display timings and image display positions of the entire image by connecting an image transmission server and multiple displays to a network.

The multi-display apparatus of the present disclosure is a multi-display apparatus for displaying a single image by combining a plurality of displays. The multi-display apparatus includes the plurality of displays connected to a network. Each of the plurality of displays includes a communication unit that communicates via the network and a controller. The controller determines whether a video signal can be reproduced at a predetermined display frame rate. When the video signal cannot be reproduced at the predetermined display frame rate, the controller changes a display frame rate from the predetermined display frame rate, and notifies other display of the display frame rate changed. When the display frame rate changed is notified from the other display, the controller changes the display frame rate to the display frame rate notified to reproduce the video signal.

Another multi-display apparatus of the present disclosure is a multi-display apparatus for displaying a single image by combining a plurality of displays. The multi-display apparatus includes the plurality of displays connected to a network. Each of the plurality of displays includes a communication unit that communicates via the network and a controller. The controller sends a request signal requesting other display to transmit specific information of a video signal displayed on the other display, and receives the specific information from the other display. The controller gives notification of correction to the other display sending the specific information with a difference when the specific information received differs from specific information of a video signal that is supposed to be displayed.

Still another multi-display apparatus of the present disclosure includes a plurality of displays connected to a network, an IP address allocator that assigns an IP address to each of the plurality of displays via the network, and a control device connected to the IP address allocator via the network. The control device sends a control signal to make each of the plurality of displays display the IP address assigned by the IP address allocator.

The multi-display apparatus of the present disclosure is effective for easily matching the image display timings and image display positions among the displays on displaying a single image using multiple displays.

DETAILED DESCRIPTION

Exemplary embodiments are detailed below with reference to drawings. However, details more than required may be omitted in the description. For example, details of well-known items and duplicate description of practically same structures may be omitted. This is to facilitate understanding of those skilled in the art by avoiding unnecessary lengthy description.

Attached drawings and description below are provided to help those skilled in the art sufficiently understand the present disclosure. They are therefore illustrative and not restrictive of subject matters of the claims.

First Exemplary Embodiment

The first exemplary embodiment is described with reference to FIGS. 1 to 4.
[1-1. Configuration]
FIG. 1 is a configuration diagram of a multi-display apparatus in the first exemplary embodiment.

Figure 1:
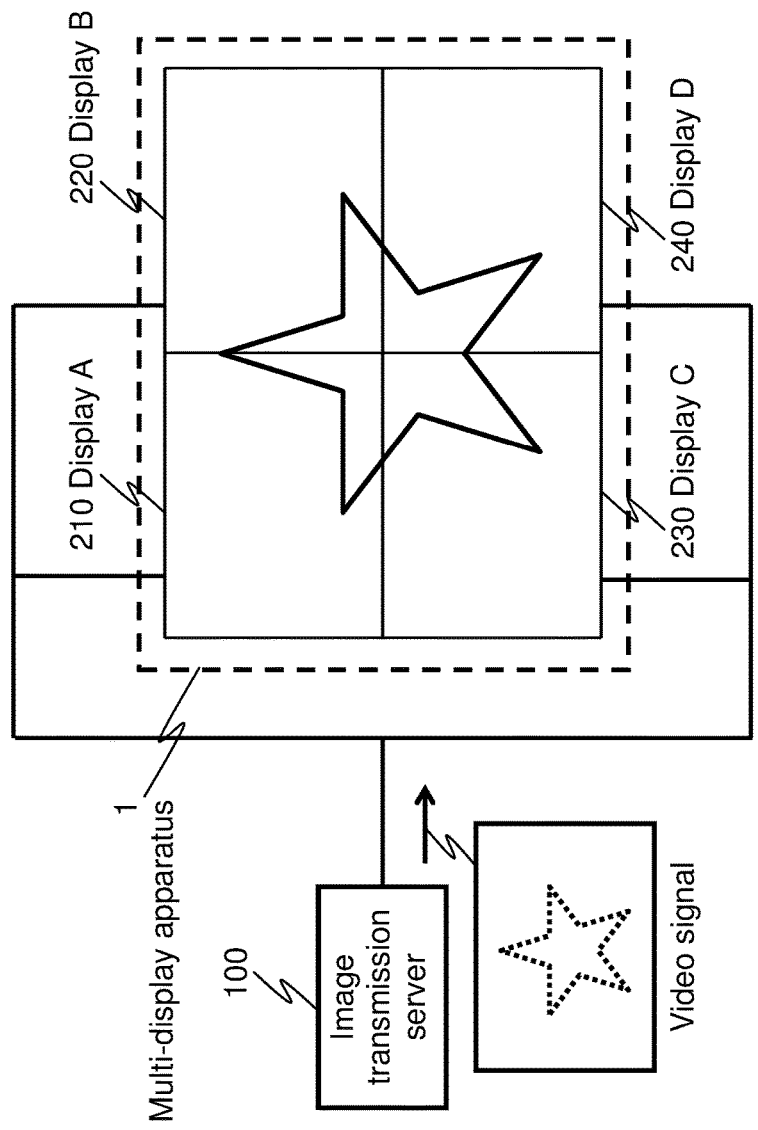
FIG. 1 is a configuration diagram of a multi-display apparatus in accordance with a first exemplary embodiment.

In FIG. 1, image transmission server 100 sends an arbitrary video signal to network-connected display A210, display B220, display C230, and display D240. In general, since a network bandwidth is limited, a video signal sent from image transmission server 100 is compressed to an appropriate size, and then sent via the network. Display A210 to display D240 are connected to image transmission server 100 via the network. These displays are capable of communication with each other via the network. Image transmission server 100 sends same video signal to each of display A210 to display D240 simultaneously. Each of display A210 to display D240 cuts out and displays a portion in charge from the received image. By combining four displays A210 to D240, a single image is displayed. In general, a video signal is sent from image transmission server 100 in a streaming format or file format, and stored in each display. However, an external memory device, such as a USB memory device and a SD card, may be used for storing the video signal in each display.

Figure 2:
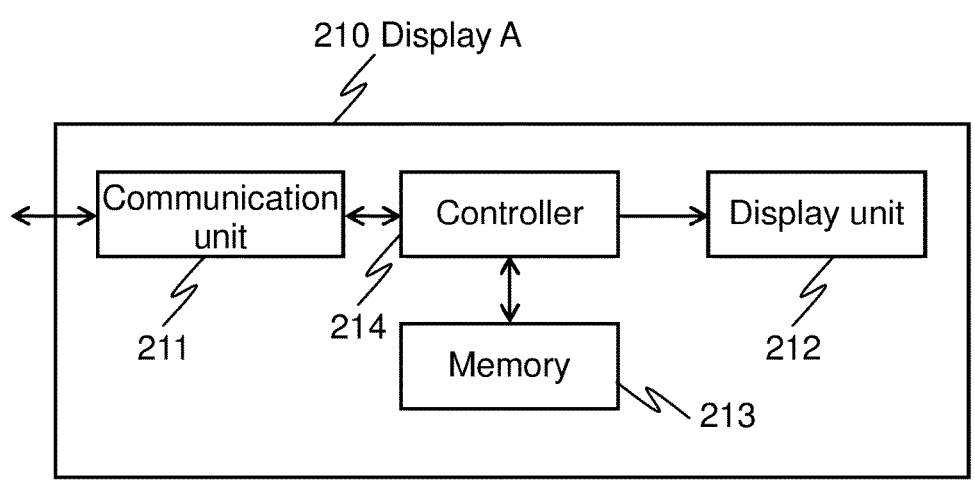
FIG. 2 is a block diagram of a display configuration in accordance the exemplary embodiment.

FIG. 2 is a block diagram illustrating a structure of each display. All displays have the same structure. FIG. 2 shows display A210 as a representative example. Display A210 includes communication unit 211 for communication via network, display unit 212 including a liquid crystal display panel, memory 213 for storing a range of data, and controller 214 for controlling these communication unit 211, display unit 212, and memory 213. Controller 214 is, for example configured with a microprocessor. This structure of the display is common to the first to sixth exemplary embodiments. Data stored in memory 213 is specifically a video signal sent from the image transmission server and a video signal for display is generated by cutting out a portion of this video signal.

To simplify description, FIG. 1 shows an example of configuring one screen (image) with four displays: display A210 to display D240. However, the number of displays and their physical layout vary, and thus not limited to the configuration shown in the first exemplary embodiment. Still more, FIG. 1 shows an example of direct network connection of image transmission server 100 and display A210 to display D240. However, equivalent configuration can be achieved by inserting a network relay, such as a switching hub and network router, in between.

[1-2. Operation]

The operation of the multi-display apparatus as configured above is described below.

Figure 3:
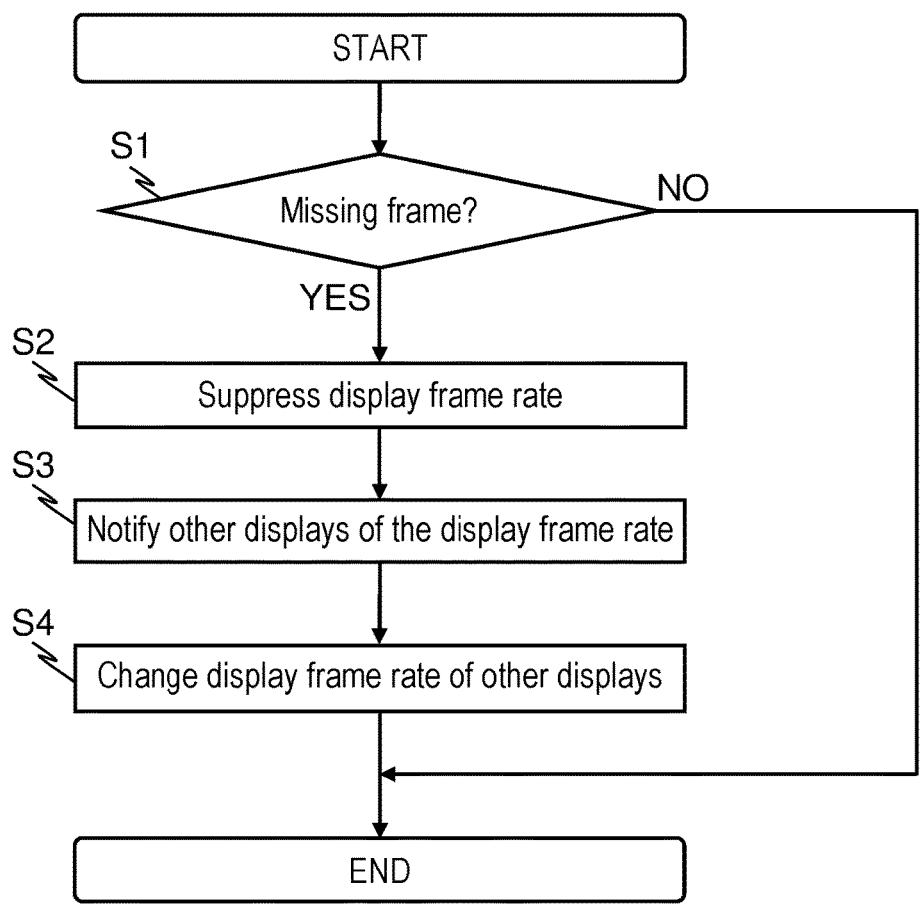
FIG. 3 is a flow chart illustrating the operation of the multi-display apparatus in accordance with the first exemplary embodiment.

FIG. 3 is a flow chart illustrating the operation of the multi-display apparatus in the first exemplary embodiment. For convenience, a case that only display A210 has insufficient capability against required reproduction capability, relative to the video signal sent from image transmission server 100, is described in the operation of the exemplary embodiment. Controller 214 equipped in each display A210 to display D240 executes processes shown in the flow chart.

Display A210 to display D240 receiving a video signal compressed by an arbitrary compression system sent from image transmission server 100 decode and reproduce each signal. General known video signal compression systems include H.264 and MPEG4-AVC. Controllers of display A210 to display D240 determine whether or not decoded video signals are reproduced (no missing frame) at a desired display frame rate (number of frames displayed per second) (Step S1).

In Step S1, display A210 to display D240 can obtain information on this video signal, such as video compression system, audio compression system, image display resolution, and display frame rate, from information attached to this video signal. Therefore, a display frame rate of the video signal and a display frame rate of actually decoded video signal can be compared.

If display A210 does not satisfy the required capability, and the required display frame rate cannot be achieved (missing frame) (YES in Step S1), the controller of display A210 suppresses (lowers) the display frame rate from the initial display frame rate of the video signal to display (Step S2).

A cause of the display frame rate of decoded video signal not reaching the required display frame rate in display A210 is low internal processing clock frequency built in display A210 or insufficient decoding capability due to insufficient resource assigned to decoding of the video signal as a result of multiple processes at the same time. For example, when image transmission server 100 sends the video signal of 60 fps (frame per second) for displaying 60 frames in a second, display A210 needs to display one frame at:

$\frac{1}{60}$ fps≈16.7 msec.

However, when the decoding capability of display A210 is insufficient, and it takes 20 msec for displaying one frame, frames displayed in one second will be only:

1 sec/20 msec=50 frames.

Compared to the case without missing display frames, time corresponding to 10 frames:

$\frac{1}{60}$ msec×10 frames≈167 msec, are delayed and accumulated every second. Accordingly, an image display timing will gradually deviate from that of other display B220 to display D240.

As a specific example of changing the display frame rate (suppression of display frame rate) in step S2, a table of display frame rate to be changed is stored in memory 213 in advance. In this case, display frame rates to be changed are defined as ½, 14/, and ⅛ of the display frame rate of the video signal sent from image transmission server 100, and they can be stored in memory 213 according to this rule. For example, in the aforementioned case, when 20 msec is required for displaying one frame relative to the video signal of 60 fps, the display frame rate in Step S2 is changed to:

60 fps/2=30 fps.

Then, a decoding time allowed for displaying one frame will be:

$\frac{1}{30}$ fps≈33.3 msec>20 msec.

This ensures display of a desired display frame at desired time. In this case, the following is further defined.
Frame No. 1: Displayed
Frame No. 2: Not displayed
Frame No. 3: Displayed
By describing in the table in memory 213 to display only odd-numbered or even-numbered display frames, display A210 can display images without any delay.

The display frame rate determined in Step S2 is notified to other display B220 to display D240 via the network from display A210 by the operation of controller 214 (Step S3).

In Step S3, other display B220 to display D240 receiving the notice change (suppress) their display frame rates of video signals to be displayed (Step S4). This enables to solve a defect of mismatched timing of images displayed in the entire multi-display apparatus 1 due to delay only in specific display A210.

In Step S4, a timing to change the display frame rate is specified by a time stamp embedded in the video signal sent from image transmission server 100 or frame number so that an image display timing of all display A210 to display D240 can be reliably matched. If there is no missing frame in Step S1 (NO in Step S1), controller 214 of display A210 ends without executing Steps S2 to S4.

MODIFIED EXAMPLE

Figure 4:
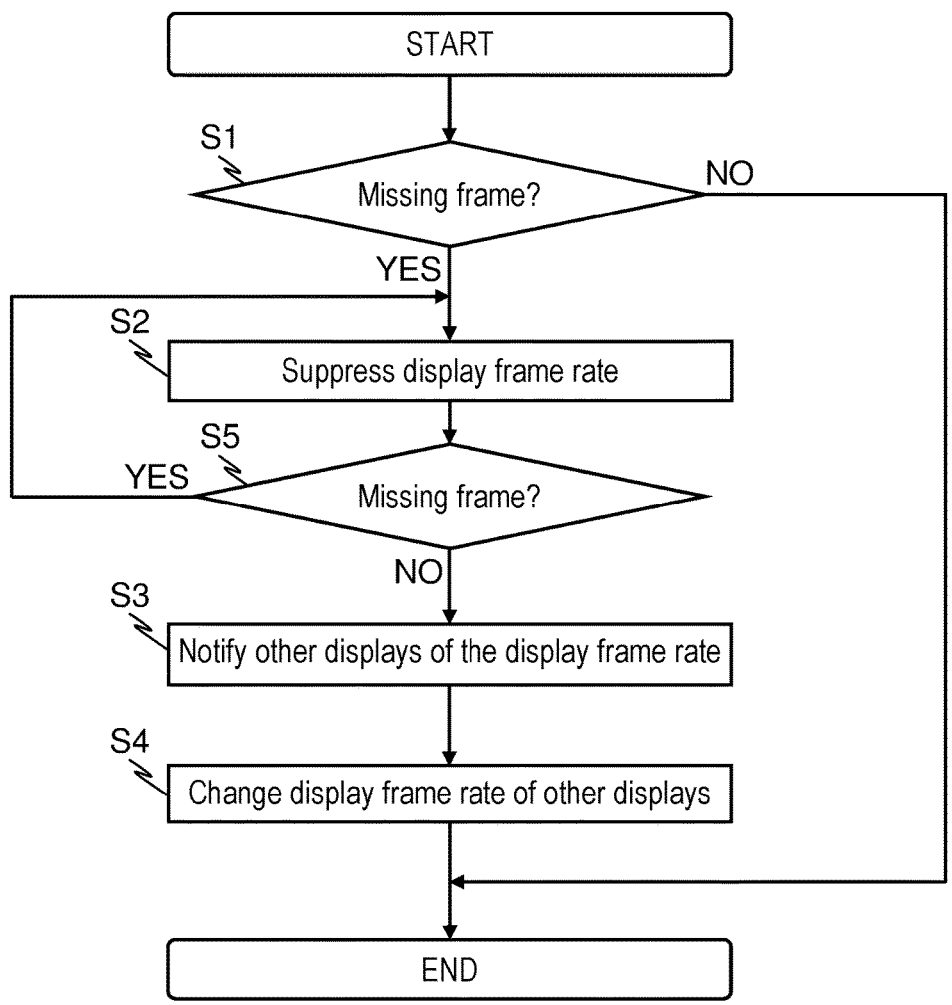
FIG. 4 is a flow chart illustrating the operation of a modified example of the multi-display apparatus in accordance with the first exemplary embodiment.

FIG. 4 is a flow chart illustrating the operation of the modified example of multi-display apparatus 1 in the first exemplary embodiment. Operations same as those in the operation steps in the flow chart in FIG. 3 are given the same reference marks to omit duplicate description. The structure of multi-display apparatus 1 is the same as that in FIG. 1 and FIG. 2.

When the display frame rate of the video signal sent from image transmission server 100 is 60 fps but decoding time of this video signal by display A210 is 40 msec, the display frame rate will be:

$\frac{1}{40}$ msec=25 fps.

Even if the display frame rate of this video signal is halved according to the table stored in memory 213, the display frame rate is:

60 fps/2=30 fps>25 fps.

A desired display frame cannot thus be displayed at desired timing. In this case, the operation according to the flow chart in FIG. 3 requires display A210 to display D240 to set the display frame rate to ¼ again after setting ½ to the display frame rate according to the table.

In FIG. 4, controller 214 of display A210 determines whether the display frame rate satisfies a required value after Step S2 (Step S5). This saves steps to change the display frame rate repeatedly in other display B220 to display D240. In addition, a frequency of image degradation at timing to change the display frame rate can be reduced.

As described above, the controller of each display determines whether or not the video signal sent from the image transmission server can be reproduced at the desired display frame rate, and notifies other displays of a reproducible display frame rate if reproduction at the desired display frame rate is not feasible. Then, other displays receiving the notice changes their display frame rates to a frame rate that can be reproduced by all displays, based on notified display frame rate, and display the video signal on the display unit.

[1-3. Effects]

As described above, the exemplary embodiment enables to match image display timings on the whole of multi-display apparatus 1 even if a display with insufficient processing capacity to display image exists.

Second Exemplary Embodiment

The second exemplary embodiment is described below with reference to

FIG. 5.

[2-1. Configuration]

Configuration of multi-display apparatus 1 is the same as that in FIG. 1 and FIG. 2 shown in the first exemplary embodiment, and thus its description is omitted here.

[2-2. Operation]

Figure 5:
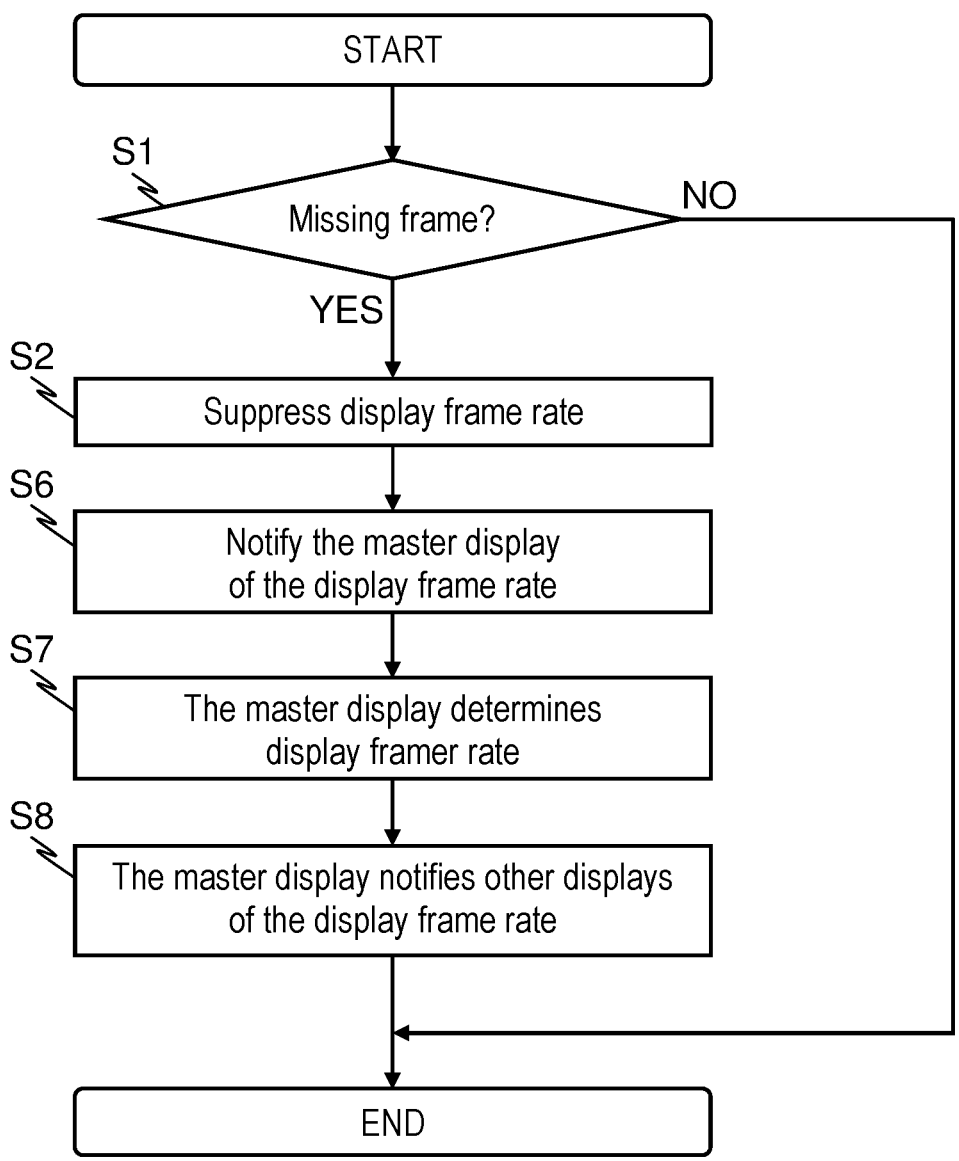
FIG. 5 is a flow chart illustrating the operation of a multi-display apparatus in accordance with a second exemplary embodiment.

FIG. 5 is a flow chart illustrating the operation of multi-display apparatus 1 in the second exemplary embodiment. Processing steps same as those in the first exemplary embodiment in the flow chart in FIG. 5 are given the same reference marks to omit their description. Controller 214 in each of display A210 to display D240 executes processes in the flow chart.

In multi-display apparatus 1 as configured in FIG. 1, only one display in display A210 to display D240, which are components of multi-display apparatus 1, is designated as a master display for grasping the state of each display A210 to display D240. The master display may be set at initial installation of multi-display apparatus 1, or a system that a display activated first at turning on the power notifies itself as a master display to other displays may be adopted. In the description of the exemplary embodiment, for convenience, display D240 is set as the master display, and display A210 is a display with insufficient capacity to execute desired reproduction of video signals sent from image transmission server 100.

In Step S2, display A210 determining to change a display frame rate notifies display D240, which is the master display, of a display frame rate after predetermined change (Step S6).

Display D240, which is the master display, waits for notification from other display B220 and display C230, and compares notified display frame rates to determine the lowest display frame rate (Step S7).

A display frame rate determined based on comparison result in Step S7 is notified from display D240, which is the master display, to other display A210 to display C230 (Step S8). This can reduce a risk of erroneous setting due to individual determination by each display when a change request for display frame rate is made from multiple displays. In addition, a determination process can be unified to reduce network traffic. Accordingly, a simple system can be configured.

[2-3. Effects]

As described above, the second exemplary embodiment provides the master display to configure the simple determination step. This enables to match image display timings on the whole of multi-display apparatus 1 even if a display with insufficient processing capacity to display image exists.

Third Exemplary Embodiment

The third exemplary embodiment is described with reference to FIG. 6.

[3-1. Configuration]

Configuration of multi-display apparatus 1 is the same as that in FIG. 1 and FIG. 2 shown in the first exemplary embodiment, and thus its description is omitted here. [3-2. Operation]

Figure 6:
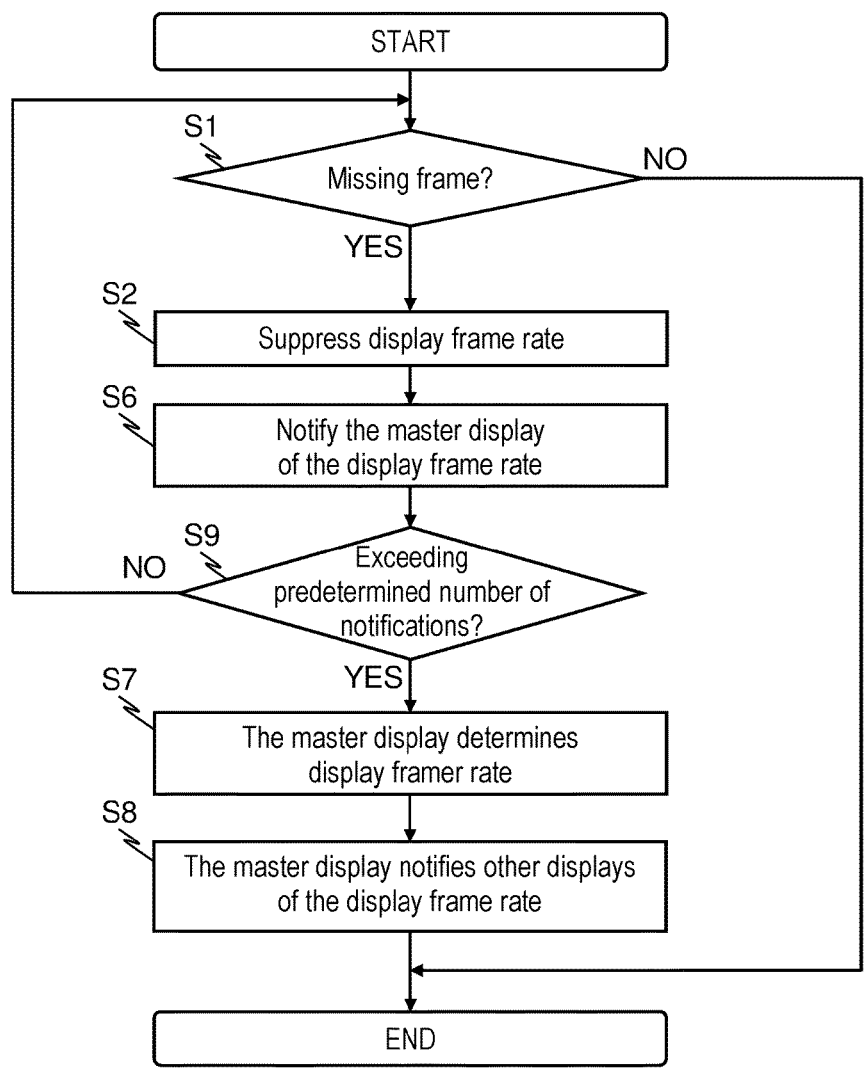
FIG. 6 is a flow chart illustrating the operation of a multi-display apparatus in accordance with a third exemplary embodiment.

FIG. 6 is a flow chart illustrating the operation of multi-display apparatus 1 in the third exemplary embodiment. Processing steps same as those in the first and second exemplary embodiments are given the same reference marks to omit their description. Controller 214 in each of display A210 to display D240 executes processes in the flow chart.

In Step S6, display B220 that is a master display receiving a display frame rate to be changed counts how many notifications have been received from the same display, and compares it with the predetermined number of notifications (Step S9). If the notifications reach the predetermined number (YES in Step S9), the operation advances to Step S7. If the notifications do not reach the predetermined number (NO in Step S9), the operation returns to Step S1. This step is effective for excluding a rare case that the desired display frame rate is not secured in Step S1 due to an unexpected increase in CPU load or overlapped interruption processes, although the display has sufficient video signal reproduction capability. Unified management of the number of notifications by display B220, which is the master display, in Step S9, enables to build a simple determination process in Step S7.

[3-3. Effects]

As described above, in the third exemplary embodiment, the master display unitarily manages the number of change notifications of display frame rate. This enables to match image display timings on the whole of multi-display apparatus 1 even if a display with insufficient processing capacity to display image exists, after excluding insufficient video signal reproduction capability due to an unexpected abnormal state.

Fourth Exemplary Embodiment

The fourth exemplary embodiment is described with reference to FIG. 7 and FIG. 8.

[4-1. Configuration]

Configuration of multi-display apparatus 1 is the same as that in FIG. 1 and FIG. 2 shown in the first exemplary embodiment, and thus its description is omitted here.

[4-2. Operation]

Figure 7:
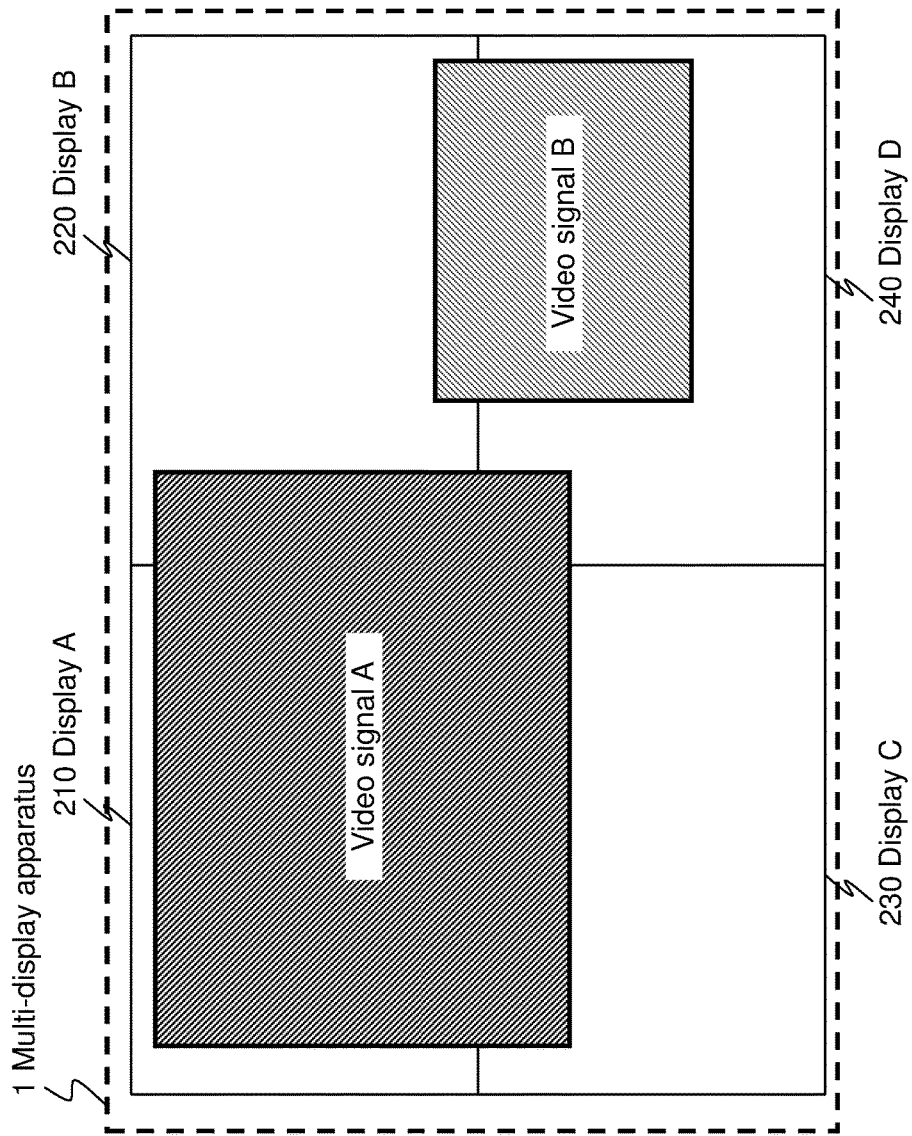
FIG. 7 is an example of a display screen of a display for illustrating the operation of a multi-display apparatus in accordance with a fourth exemplary embodiment.

FIG. 7 is an example of a display screen for illustrating the operation of multi-display apparatus 1 in the fourth exemplary embodiment. Same reference marks are given to steps same as those in aforementioned first to third exemplary embodiments, and thus their description is omitted here. Controller 214 in each of display A210 to display D240 executes processes in the flow chart.

As shown in FIG. 7, multi-display apparatus 1 may be used for simultaneously displaying multiple video signal A and video signal B from image transmission server 100. There may be a phenomenon that video signal A can be displayed at a desired display frame rate on display B220, but video signal B has too high resolution or image bit rate to achieve a desired display frame rate. In this case, a changed display frame rate is notified to all other displays in the first exemplary embodiment. However, in an example in FIG. 7, display B220 may give notification of the changed display frame rate only to display D240 that is displaying video signal B whose desired display frame rate cannot be achieved.

Figure 8:
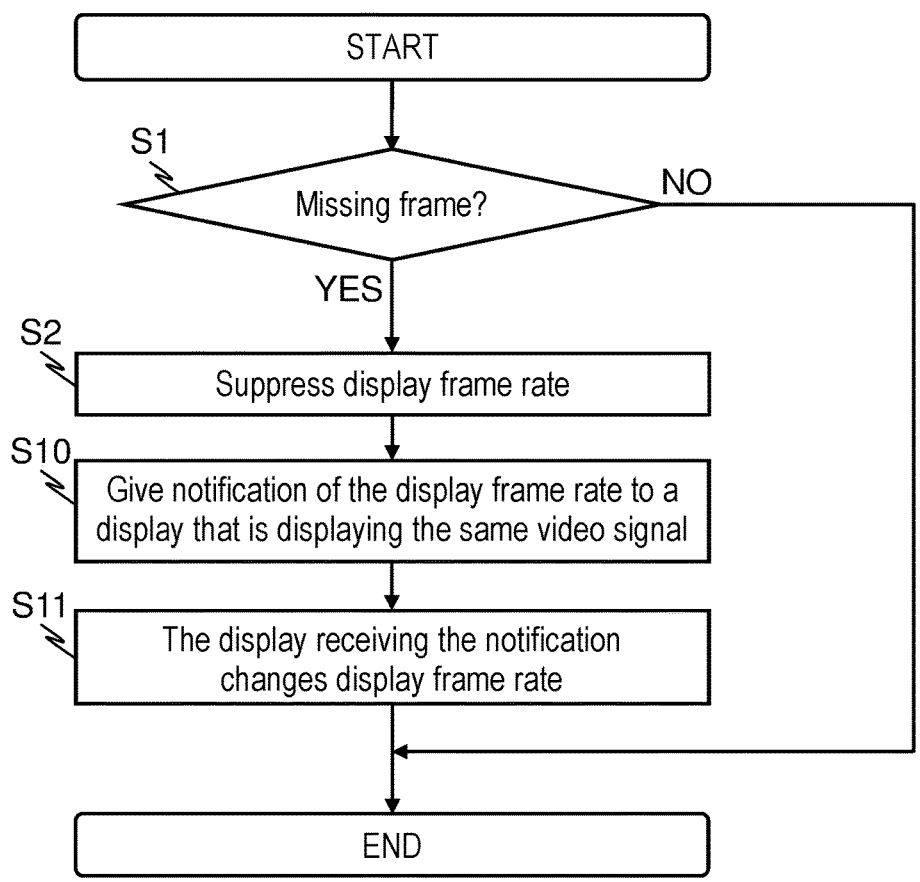
FIG. 8 is a flow chart illustrating the operation of the multi-display apparatus in accordance with the fourth exemplary embodiment.

FIG. 8 is a flow chart illustrating the operation of multi-display apparatus 1 in the fourth exemplary embodiment.

In Step S2, display B220 determining the display frame rate to change gives notification of the changed display frame rate only to display D240 displaying video signal B whose desired frame rate is not achieved in display B220 (Step S10). In other words, the display detecting a missing frame notifies the changed display frame rate only to a display that is displaying the same video signal. Information on which video signal is displayed on which display may be sent from image transmission server 100 to all display A210 to display D240.

In Step S10, display D240 receiving the notification of the changed display frame rate changes (suppresses) the display frame rate of video signal B to the predetermined frame rate (Step S11).

When a master display is set, such as in the second and third exemplary embodiments, the master display receiving the notification of display frame rate in Step S6 in FIG. 5 and FIG. 6 can give notification of changed display frame rate only to a display that is displaying a video signal same as the video signal involving the notified display frame rate.

[4-3. Effects]

As described above, a change notification of display frame rate is given only to a display that is displaying a video signal whose desired display frame rate is not achieved in a specific display in the fourth exemplary embodiment. This enables to match image display timings on the whole of multi-display apparatus 1 with a simple configuration even if a display with insufficient processing capacity to display image exists.

Fifth Exemplary Embodiment

Figure 9:
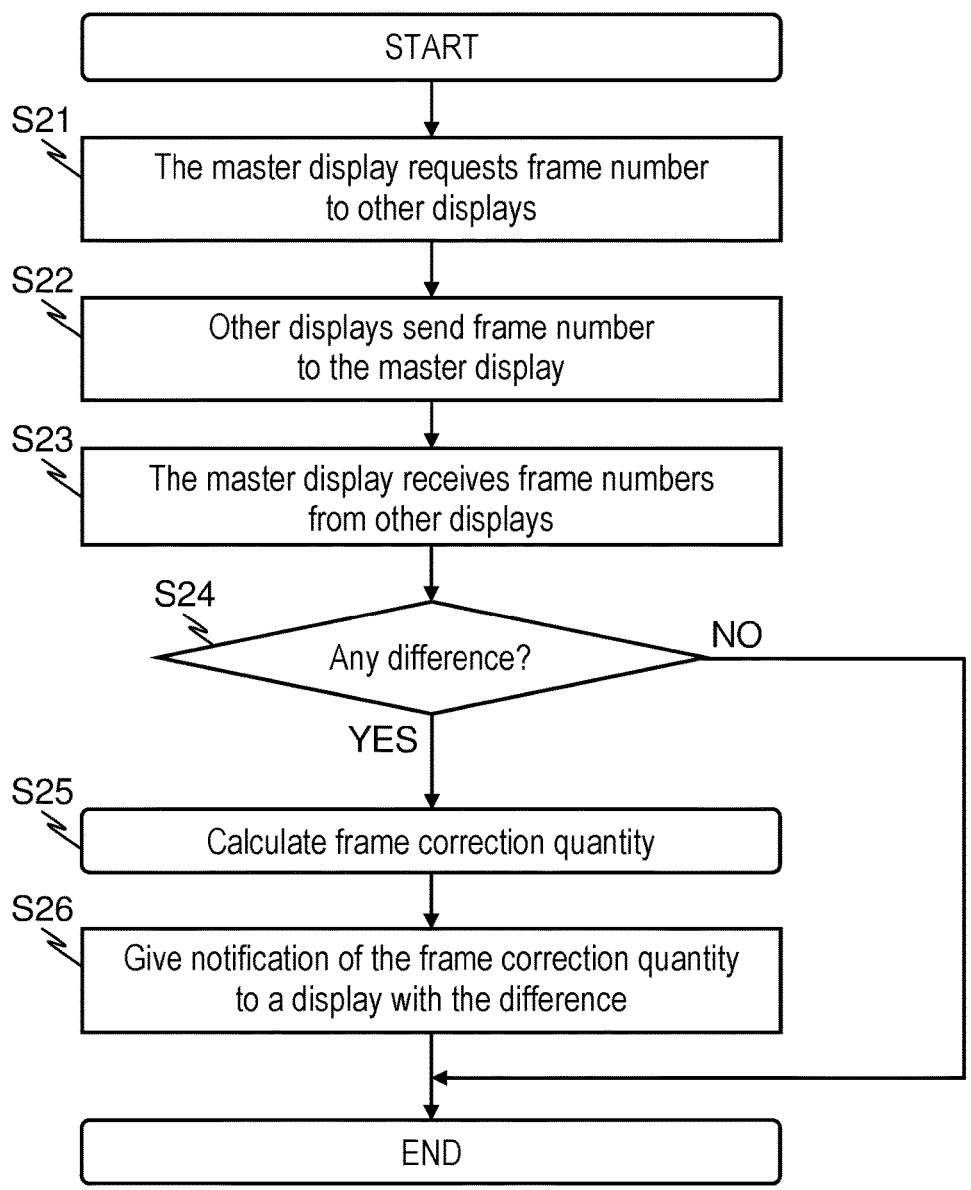
FIG. 9 is a flow chart illustrating the operation of a multi-display apparatus in accordance with a fifth exemplary embodiment.

The fifth exemplary embodiment is described with reference to FIG. 9 and FIG. 10.

[5-1. Configuration]

Configuration of multi-display apparatus 1 is the same as that in FIG. 1 and FIG. 2 shown in the first exemplary embodiment, and thus its description is omitted here.

[5-2. Operation]

The operation of multi-display apparatus 1 in the fifth exemplary embodiment is described below. FIG. 9 is a flow chart illustrating the operation of multi-display apparatus 1 in the fifth exemplary embodiment. Controller 214 in each display A210 to display D240 executes the processes in the flow chart.

A frame number or time stamp is added as specific information of video signal to each frame or a reference frame in the video signal sent from image transmission server 100. In other words, the frame number is an example of specific information of the video signal, and the time sample is also another example of the specific information of the video signal.

First, one display requests other displays to notify the frame number or time stamp of the video signal displayed on each of other displays (Step S1). In Step S21, specific time may be designated, and the frame number or time stamp of the video signal displayed on other displays at that time may be requested. In the exemplary embodiment, for convenience, a display requesting this notice is called a master display, and display D240 is the master display in the following description. A method of determining the master display is described later.

In the exemplary embodiment, the frame number is used as an example of information added to the video signal. However, the same effect is achievable when a time stamp is used as added information. Since the video signal also has information on the number of frames displayed per second (display frame rate) as another added information, the frame number of the frame to which the time stamp is added can be calculated based on the time stamp and display frame rate. For example, in the video signal whose frame rate is 60 fps, the frame number of the frame to which the time stamp of 28.50 sec is added can be calculated by the following formula.

28.50 sec×60 fps=Frame No. 1710

Other display A210 to display C230 to which display D240 requests for a notice (Step S21) send a frame number of the video signal displayed in each display A210 to display D240 (Step S22). In Step S22, time that this frame number is displayed may be sent to display D240 together with the frame number. For example, although each display is displaying the same frame number, if absolute times at which the frame number is displayed are different, display is out of synchronization as whole multi-display apparatus 1, failing to achieve desired image display. Therefore, by sending both the frame number and display time of that frame number to display D240, the frame number of video signal displayed on each display at specific time can be identified.

As precondition, absolute times of display A210 to display D240 configuring multi-display apparatus 1 need to be matched. A known related technology is PTP (Precision Time Protocol) specified by IEEE1588-2008. The use of this PTP technology enables to match absolute times among display A210 to display D240.

Next, display D240 receives a frame number of video signal displayed in each display at specific time from other display A210 to display D230 (Step S23).

Display D240 calculates a desired frame number at specific time notified in Step S21, and compares its calculation result with the frame number received in step S23 for each display to determine any difference (Step S24).

For example, a desired frame number displayed at 2 minutes and 0 second in a 60-fps video signal is frame No. 7200 according to the next formula.

120 sec×60 fps=Frame No. 7200

If the frame number received from display A210 in Step S23 is No. 7190, display on display A210 is delayed from the required value for:

(Frame No. 7200)−(Frame No. 7190)=10 frames, or 10 frames×(1/60 fps)=0.16 sec.

A delay in display may be caused by low frequency of internal processing clock built in the display, or processing of multiple tasks at the same time. A resource is not sufficiently allocated to decoding of video signal, resulting in insufficient decoding capability. An image reproduction capability of the display thus does not satisfy desired performance.

When a frame number different from the desired frame number (difference exists) is detected (Yes in Step S24), display D240 calculates a frame correction quantity (Step S25). In the above example, this frame correction quantity will be:

(Frame No. 7200)−(Frame No. 7190)=10 frames.

Display D240 notifies delayed display A210 of the frame correction quantity calculated in Step S25 (Step S26). In Step S26, display A210 receiving the frame correction quantity displays a video signal of the frame number after skipping the frame correction quantity received. For example, in the above example, when display A210 is displaying the video signal of frame No. 8600, next frame number to be displayed is supposed to be No. 8601. However, the above frame correction quantity is applied according to the next formula, and frame No. 8611 is displayed.

(Frame No. 8601)+(Frame correction quantity: 10 frames)=Frame No. 8611

In the aforementioned example, correction is applied at once for 10 frames, which is the frame correction quantity. However, there are various correction methods, such as correction of two frames for five times, so as to suppress the number of frames skipped at once for reducing a sense of incongruity of viewers watching multi-display apparatus 1. If there is no difference (NO in Step S24) in Step S24, controller 214 of display D240 ends without processes in Steps S25 and S26.

Figure 10:
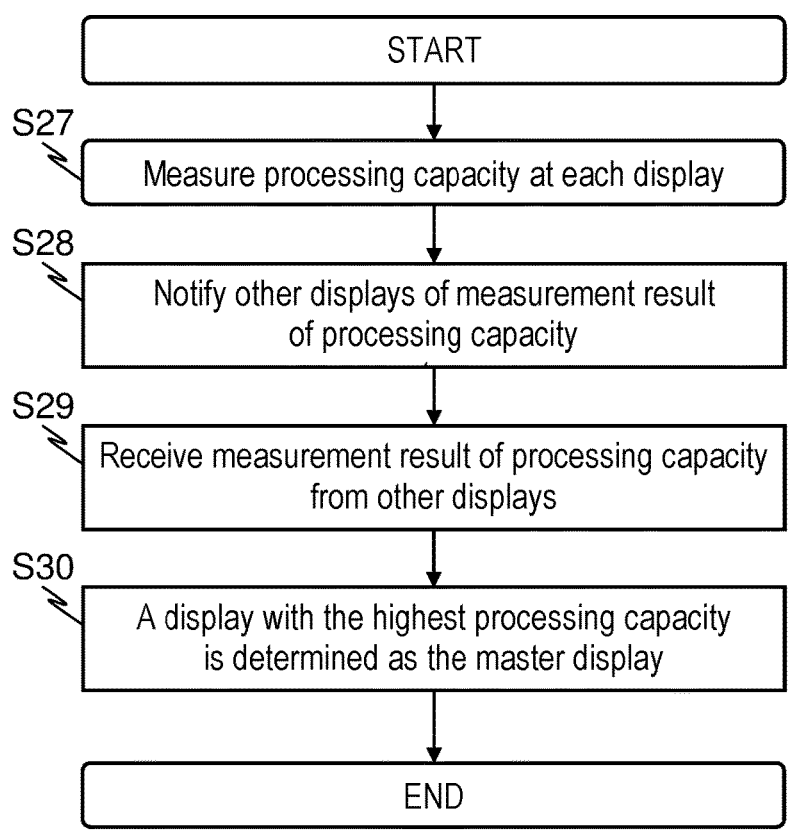
FIG. 10 is a flow chart illustrating the operation determining a master display in the multi-display apparatus in accordance with the fifth exemplary embodiment.

FIG. 10 is a flow chart illustrating the operation of determining the master display in multi-display apparatus 1 in the exemplary embodiment. This master display communicates with all other displays, and continuously executes predetermined arithmetic processing. Its processing load is thus heavy compared to other displays. Accordingly, a display with the highest processing capability in multi-display apparatus 1 is set as the master display to facilitate retention of performance of the entire device.

First, a processing capability of each of display A210 to display D240 configuring multi-display apparatus 1 is measured (Step S27). Timing to measure is when multi-display apparatus 1 is installed, or when the power of the entire device is turned on. The processing capability may be calculated by CPU load rate, or may use a result of benchmark test evaluating computing power.

Next, each of display A210 to display D240 notifies a measurement result of processing capacity measured in Step S27 to other displays configuring multi-display apparatus 1 (Step S28).

Then, each of display A210 to display D240 receives measurement results of processing capacity of all other displays notified in Step S28.

Then, each of display A210 to display D240 compares the measurement result of processing capacity of other displays notified in Step S29 with the measurement result of its own processing capacity to determine whether or not the display itself should be a master display (Step S30). Based on a result of comparison, each of display A210 to display D240 determines itself to be a maser display if the measurement result of its own processing capacity is the highest, and not a master display if not the highest. If the measurement result of its own processing capacity and measurement results of processing capacity of other displays are the same, a display notifying the measurement result of processing capacity first, or a display whose power is turned on first is set as the master display. By providing this kind of rule in advance, only one master display can be set in multi-display apparatus 1.

In addition, to reliably operate multi-display apparatus 1, a display determining itself to be the master display preferably notifies other displays of the determination. A rule should be further provided to reset a master display if none or multiple displays notify other displays of the master display. In the exemplary embodiments, absolute times of displays are matched. However, relative times may be matched.

As described above, the exemplary embodiment enables to match display timings of all displays at desired original timing of the video signal, without adjusting the displays to a display with the slowest display timing.

Sixth Exemplary Embodiment

The sixth exemplary embodiment is described below with reference to FIGS. 11 to 14.

[6-1. Configuration]

Figure 11:
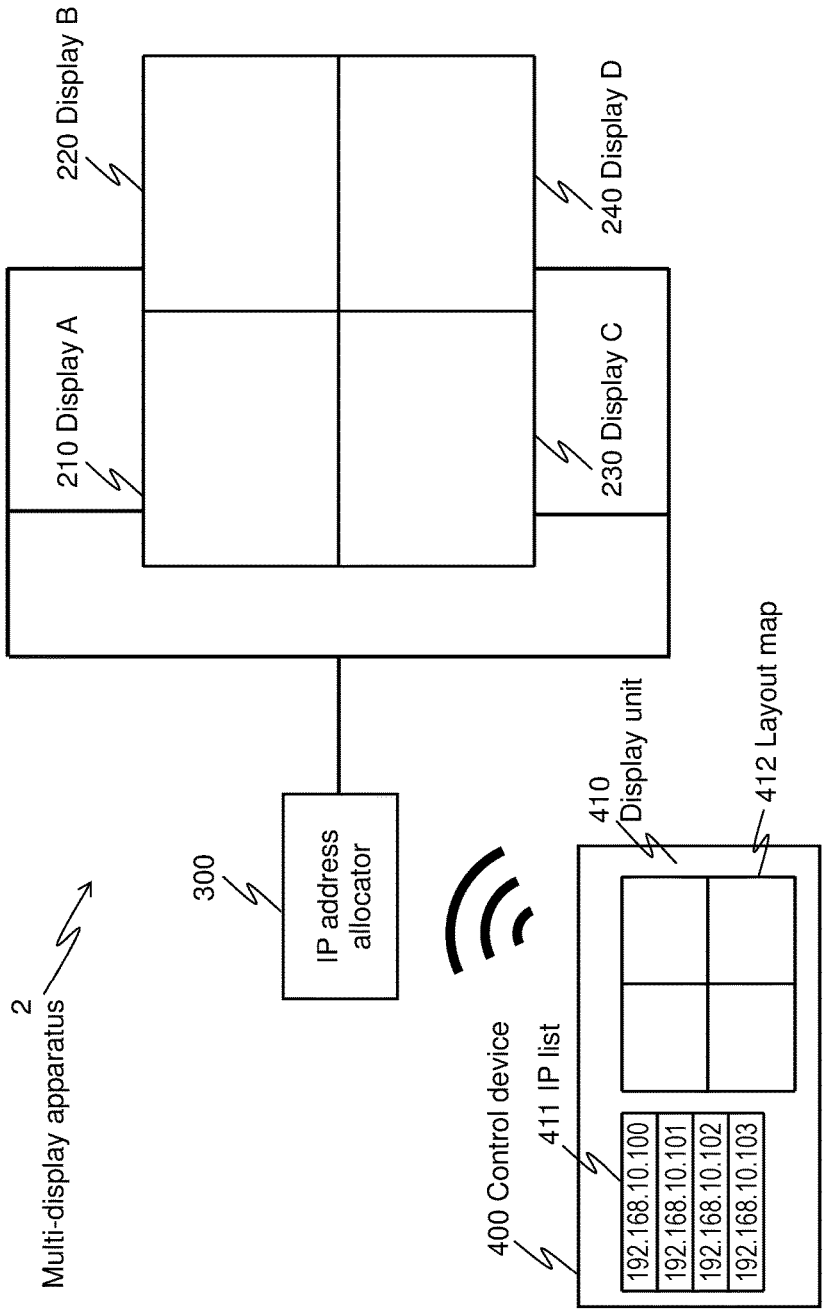
FIG. 11 is a configuration diagram of a multi-display apparatus in accordance with a sixth exemplary embodiment.

FIG. 11 is a configuration diagram of multi-display apparatus 2 in the exemplary embodiment.

In FIG. 11, IP address allocator 300 has a function to assign an inherent IP address to each piece of equipment connected to a network. An access point or network hub having a DHCP (Dynamic Host Configuration Protocol) server function can be used as this IP address allocator 300. Control device 400 is network-connected to IP address allocator 300, and an arbitrary IP address is assigned. A notebook PC and tablet PC are used as this control device 400.

Display A210 to display D240 are network-connected to IP address allocator 300, and an inherent IP address is assigned to each display. In FIG. 11, to simplify description, an example given is one screen configured with four displays A210 to D240 aligned two vertically and two horizontally in a layout. However, the number of displays and their layout vary, and thus the configuration is not limited to that shown in the exemplary embodiment.

Internal structure of display A210 to display D240 is the same as that in the first exemplary embodiment, and its description is thus omitted.

[6-2. Operation]

The operation of multi-display apparatus 2 as configured above is described below.

Figure 12:
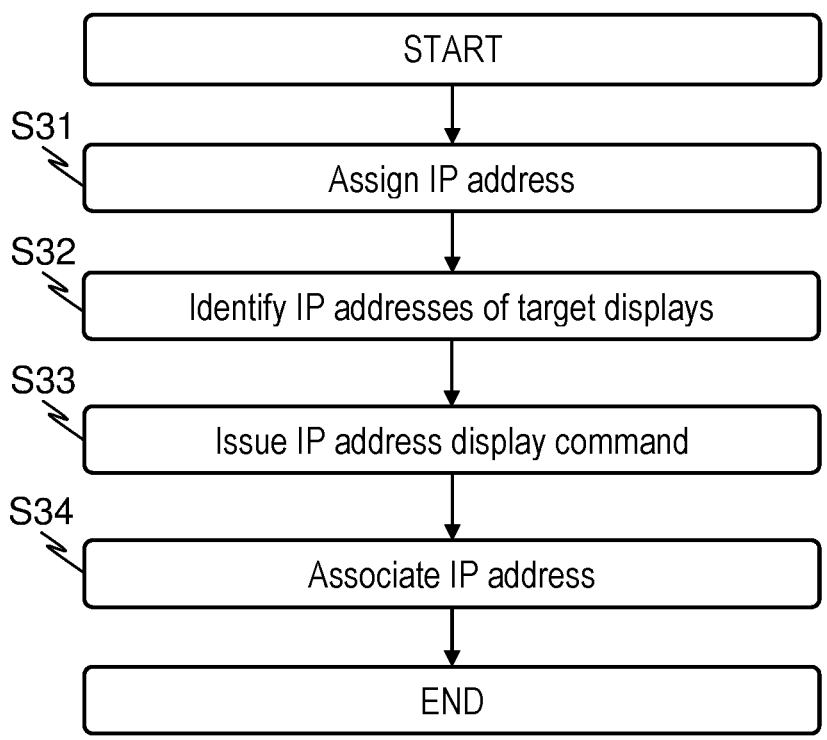
FIG. 12 is a flow chart illustrating the operation of the multi-display apparatus in accordance with the sixth exemplary embodiment.

FIG. 12 is a flow chart illustrating the operation of multi-display apparatus 2 in the sixth exemplary embodiment.

First, IP address allocator 300 having the DHCP server function individually assigns an arbitrary IP address to all pieces of equipment network-connected to this IP address allocator 300 (Step S31). In the exemplary embodiment, IP address allocator 300 assigns IP address to control device 400, and display A210 to display D240. This makes control device 400 and display A210 to display D240 participate in the same network in the configuration shown in FIG. 11, and thus communication is established in both ways via the network.

Next, control device 400 sends via the network a specific command that only target displays can respond to all pieces of equipment participating in the network in which control device 400 participates. In general, the multi-display apparatus is configured with displays of the same manufacturer, due to reasons of appearance quality and easy maintenance, and thus the displays can respond to the specific command. Display A210 to display D240 receiving this specific command send an IP address assigned to each display to control device 400 via the network. On the other hand, if equipment other than target displays receives this specific command, it cannot interpret the command received and thus nothing is returned to control device 400. As a result, control device 400 can identify only IP addresses assigned to target displays (Step S32).

Figure 13:
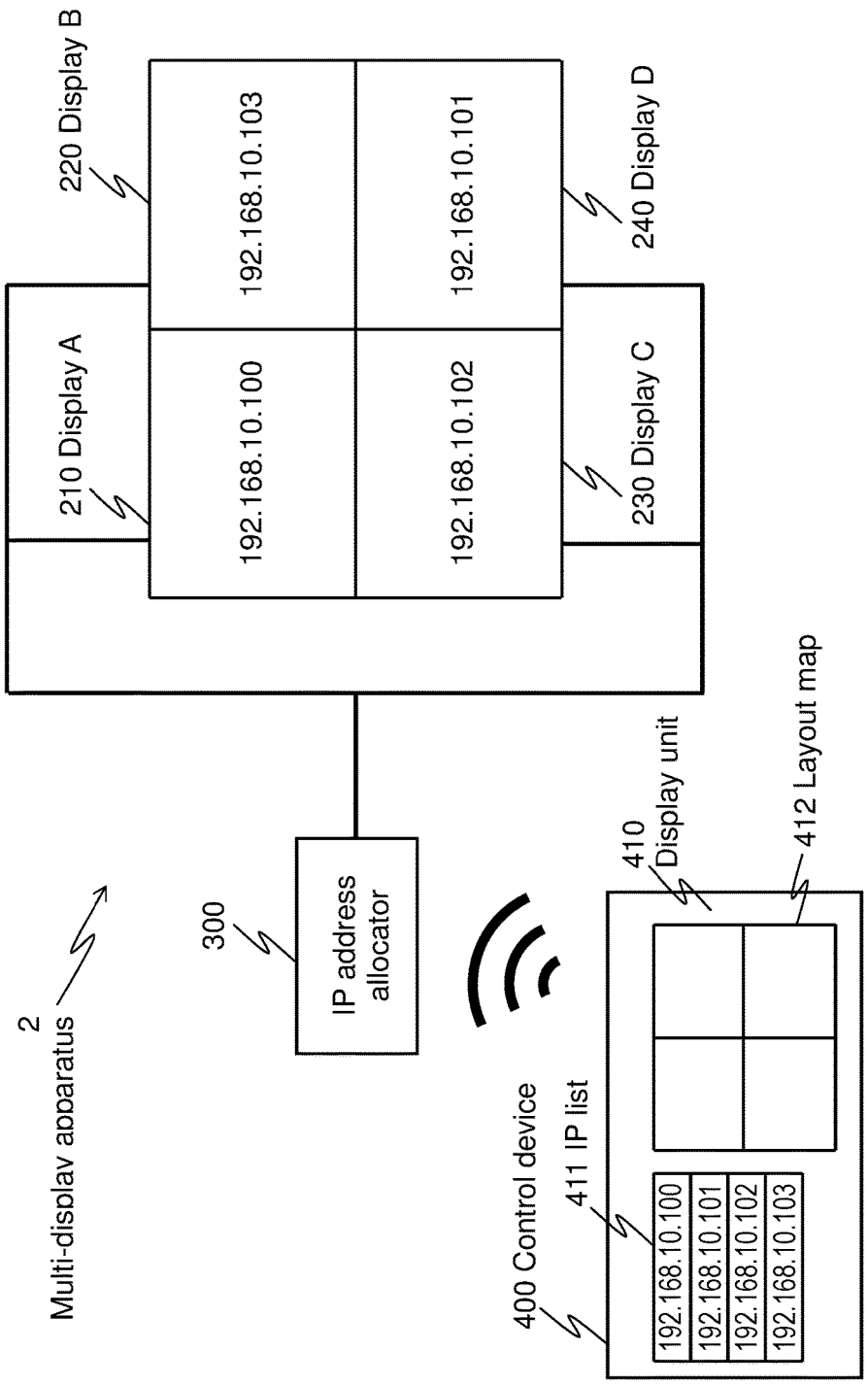
FIG. 13 is a configuration diagram illustrating the operation for displaying an IP address on multiple displays in accordance with the sixth exemplary embodiment.

Next, control device 400 issues an IP address display command to display A210 to display D240. In other words, control device 400 sends a control signal to make the displays display IP address (Step S33). FIG. 13 describes this Step S33. Control device 400 uses IP addresses of target displays A210 to display D240 identified in Step S32, and issues a command for displaying IP address to target display A210 to display D240. Display A210 to display D240 then display IP addresses assigned, as shown in FIG. 13, respectively.

FIG. 13 shows an example that only IP address is displayed in Display A210 to display D240. However, entire network setting information, such as subnet mask and gateway information, of display A210 to display D240 may be displayed. Or, basic setting information, such as brightness and contrast settings, of display A210 to display d240 may be included. IP address is displayed on display unit 212 according to an IP address display command obtained by controller 214 via communication unit 211.

Figure 14:
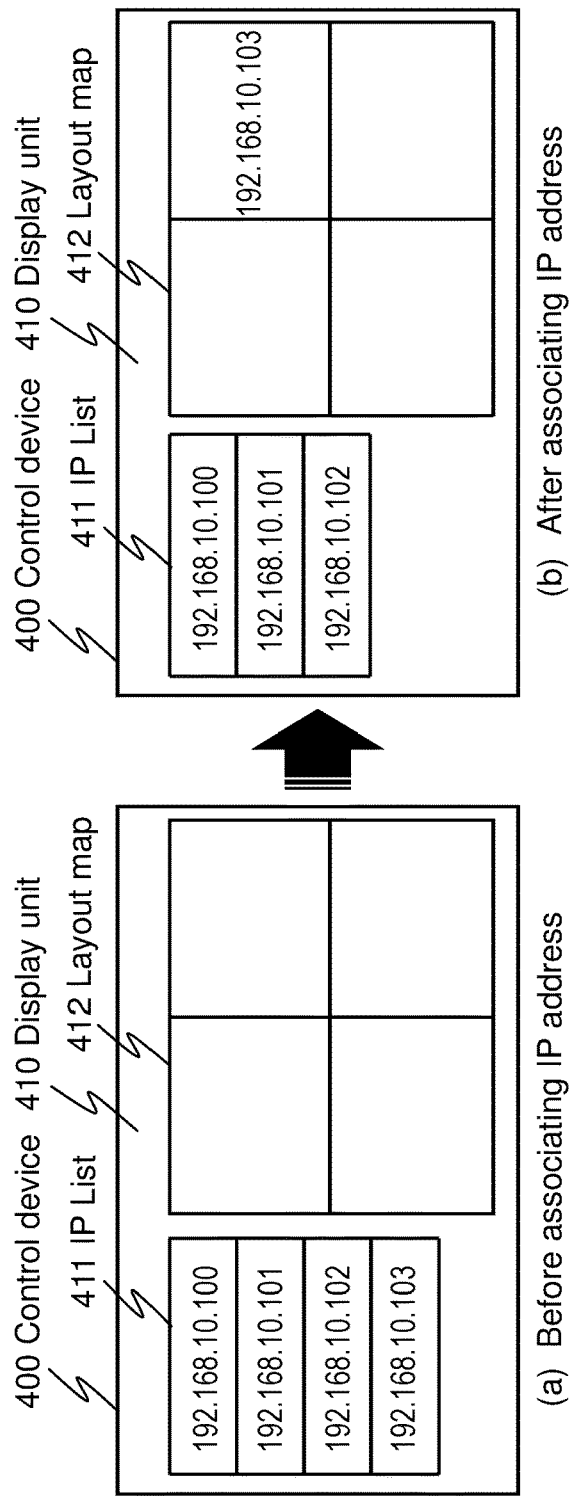
FIG. 14 is an example of a display screen of a control device in accordance with the sixth exemplary embodiment.

Next, an operator associates IP addresses (Step S34). FIG. 14 shows processing in this Step S34. FIG. 14 (*a*) shows an example of screen of control device 400 before executing Step S34. In IP list 411 in FIG. 14, only IP addresses of display A210 to display D240 in all IP addresses assigned by IP address allocator 300 are displayed in a list in the form of icons on display unit 410.

IP addresses to be displayed may also be obtained by network communication of IP address allocator 300 and control device 400.

The operator's work can be most reduced by displaying only IP addresses of desired display A210 to display D240 on display unit 410 of control device 400. This is achieved, as described above, by issuing a manufacturer command (specific command) that only display A210 to display D240 can receive from control device 400 so that only IP addresses assigned to display A210 to display D240 can be displayed in a list of IP addresses on control device 400.

In FIG. 14(a), a figure drawn in a matrix of two vertical and two horizontal faces is displayed next to IP list 411. This is layout map 412 indicating physical layout of display A210 to display D240. When multi-display apparatus 2 is configured with two vertical and two horizontal displays shown in FIG. 11, this layout is displayed in control device 400. A system described in PTL 1 is generally known as a display method of this physical layout.

As shown in FIG. 13, the operator of control device 400 can visually identify that the IP address assigned to display B220 is 192.168.10.103 as a result of Step S33. Therefore, display B220 at the right top can be associated with IP address 192.168.10.103 by dragging and dropping an icon of IP address displayed in IP list 411 to a physical layout of displays shown in display unit 410 of control device 400. Duplicate or negligence of setting IP address in subsequent setting work can be prevented if the IP address already associated with layout map 412 is deleted by dragging and dropping from IP list 411 displayed in display unit 410 of control device 400.

[6-3. Effects]

As described above, the exemplary embodiment enables the operator to easily associate physical layout positions with IP addresses of display A210 to display D240 without separately providing a special imaging device. This enables to identify which portion of image data sent from external image transmission server network-connected to IP address allocator 300 should be displayed on which of display A210 to display D240. A multi-display apparatus can thus be easily configured. Still more, the image transmission server can send divided images for each display in advance because the image transmission server can identify physical layout positions of display A210 to display D240 and their IP addresses. This can reduce processing load of each display A210 to display D240. Furthermore, only IP addresses of desired display A210 to display D240 are displayed on display unit 410 of control device 400, and thus a work load of the operator can be reduced.

The above exemplary embodiments are to be considered in all respects as illustrative, and the scope of the invention being indicated by the appended claims and all changes, replacements, additions, and omissions which come within the meaning and range of equivalency of the claims are therefore intended to be embraced therein.

INDUSTRIAL APPLICABILITY

The present disclosure is applicable to multi-display apparatuses to which multiple displays are network-connected to configure a single screen. More specifically, the present disclosure is applicable to those configured with multiple liquid crystal displays, including video wall systems and signage systems.

What is claimed is:

1. A multi-display apparatus for displaying a single image by combining a plurality of displays, the multi-display apparatus comprising:
the plurality of displays that are connected to a network, wherein each of the plurality of displays includes,
a communication unit configured to communicate via the network, and
a controller configured to determine whether a video signal can be reproduced at a predetermined display frame rate,
wherein,
when the video signal cannot be reproduced at the predetermined display frame rate, the controller changes a display frame rate from the predetermined display frame rate, and notifies other display of the display frame rate changed, and
when the display frame rate changed is notified from the other display, the controller changes the display frame rate to the display frame rate notified to reproduce the video signal.

2. The multi-display apparatus of claim 1, wherein:
each of the plurality of displays has a memory, and
the controller changes the display frame rate from the predetermined display frame rate based on a predetermined table stored in the memory.

3. The multi-display apparatus of claim 1, wherein:
a master display is set from the plurality of displays,
the controller of each of the plurality of displays other than the master display notify the master display of the display frame rate to change, and
the controller of the master display notifies the plurality of displays other than the master display of a smallest display frame rate in the display frame rate notified.

4. The multi-display apparatus of claim 3, wherein when the display frame rate to change is notified from a same display exceeding a predetermined number of times, the controller of the master display notifies the plurality of displays other than the master display of the display frame rate notified.

5. The multi-display apparatus of claim 1, wherein the controller gives notification of the display frame rate changed only to a display that is displaying a video signal corresponding to the display frame rate changed.

6. The multi-display apparatus of claim 1, wherein the controller of each of the plurality of displays obtain a timing to change the display frame rate from information included in the video signal.

7. A multi-display apparatus for displaying a single image based on a video signal by combining a plurality of displays, the multi-display apparatus comprising:
the plurality of displays that are connected to a network, wherein each of the plurality of displays includes,
a communication unit configured to communicate via the network, and
a controller configured to send a request signal requesting other display to transmit specific information of a video signal displayed on the other display, calculate a difference between the specific information received and specific information of a video signal that is supposed to be displayed, receive the specific information from the other display, and give notification of correction amount for the specific information to the other display sending the specific information with the difference.

8. The multi-display apparatus of claim 7, wherein the controller of each of the plurality of displays conducts mutual time synchronization periodically.

9. The multi-display apparatus of claim 7, wherein the controller sets a master display in the plurality of displays through mutual communication, and controller of the master display sends the request signal to the other display.

* * * * *